(No Model.)
T. GINGRAS.
LEATHER WASHER.
No. 441,406.                    Patented Nov. 25, 1890.
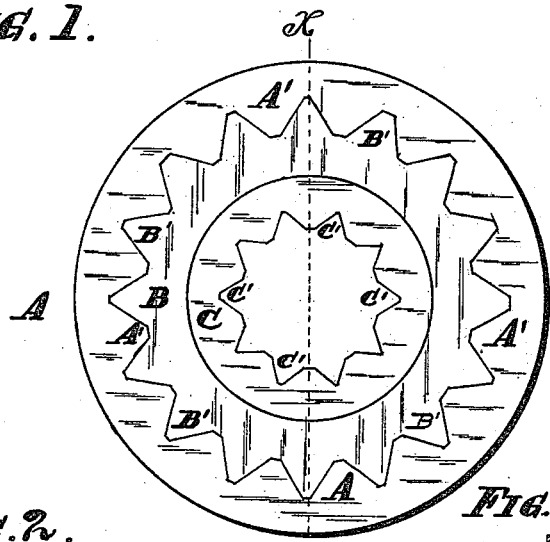
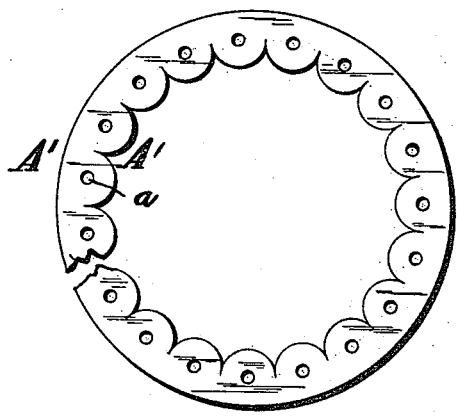
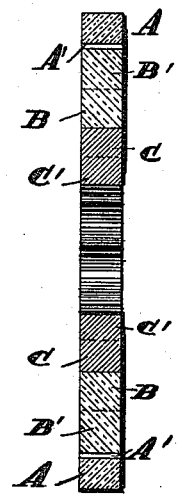
Witnesses:
Al. Stark
Centie S. Stark
Inventor:
Timothy Gingras
by Michael J. & d. Wm O. Stark,
Attorneys.

United States Patent Office.

TIMOTHY GINGRAS, OF BUFFALO, NEW YORK.

LEATHER WASHER.

SPECIFICATION forming part of Letters Patent No. 441,406, dated November 25, 1890.

Application filed August 8, 1890. Serial No. 361,438. (No model.)

*To all whom it may concern:*

Be it known that I, TIMOTHY GINGRAS, of Buffalo, in the county of Erie and State of New York, have invented certain new and useful Improvements in Axle-Washers; and I do hereby declare that the following description of my said invention, taken in connection with the accompanying sheet of drawings, forms a full, clear, and exact specification, which will enable others skilled in the art to which it appertains to make and use the same.

This invention has general reference to improvements in axle-washers; and it consists, essentially, in the novel and peculiar combination of parts and details of construction, as hereinafter first fully set forth and described, and then pointed out in the claims.

In the drawings hereinbefore referred to, Figure 1 represents a plan of a washer embodying my invention. Fig. 2 illustrates a slight modification of the same. Fig. 3 is a transverse sectional elevation in line X X of Fig. 1.

Similar letters of reference are used to designate corresponding parts in the several figures.

The object of this invention is the production of a more efficient as well as cheaper axle-washer than those now known and used, it being especially adapted to washers for use in the larger sizes of axles, such washers being usually constructed with a comparatively wide face.

A further object of my invention is the provision of means within the washer for retaining a portion of the lubricant applied to the axle, whereby when the axle is caused to run hot on account of insufficient lubrication the grease retained in the washer will assume a liquid (or nearly so) state, (by the heat of the axle,) and thereby sufficiently lubricate the same to prevent injury to the axle and hub.

This invention relates more especially to such washers having a wide face, and to attain the result hereinbefore set forth I punch from a suitable hide of leather, by means of dies or other mechanism, a circular blank A, of a diameter equaling the diameter of the largest washer generally used, and then punch from the center of this blank a smaller blank B; but instead of using dies of a circular circumference for this purpose I provide the same with a serrated circumference, so that the blank (or now annulus) will have a serrated interior edge A' to provide retaining-spaces for the lubricant when the annulus or washer is placed upon the axle. The blank B is now provided with a serrated periphery B' the extreme diameter of which equals the diameter of the next smaller washer. The center of this blank is now similarly punched out, but with a die having a circular circumference, thereby forming a washer having serrations or lubricant-retaining spaces B' upon the periphery thereof instead of upon the interior. The blank remaining by the punching out of the washer B has its center also punched out, but with a serrated die, thereby forming a washer having the serrations on the interior of the same. This proceeding is continued, alternately using circular and serrated dies, until the remaining blank is of such small diameter as to be of no avail in the manufacture of washers.

In Fig. 2 I have illustrated a washer employing serrations of different shape, also providing the same with apertures *a* to afford extra retaining-spaces for the lubricant. In some cases I may simply slit the interior of the washers, and, in fact, may use many dissimilar forms of recesses and serrations in the washers, all of which would be within the spirit, nature, and scope of my invention.

In punching out the washer, as hereinbefore described, I obtain alternately washers having their interiors and circumferences respectively serrated or recessed, thereby obviating any loss whatever of material, for in punching out the central blank to form a serrated inner edge for the washer the outer edge of the next smaller washer is immediately formed.

In operation the fact of having the serrations upon the periphery of the washer instead of upon the interior has no effect upon the usefulness of the same, the lubricant lodging in the interstices in the washer with equal facility in either case.

Another great advantage of these washers lies in the fact that they can be easily trimmed to fit an axle should they be either too large or too small.

In practice I shall probably pack in suitable boxes or packages an equal number of washers having outside serrations with those having inside recesses, so that should it happen to the buyer that the washers do not exactly fit the axle, he may, by selecting the proper washer, easily trim the same to fit the axle by cutting away a portion of the recesses.

I now desire it understood that I do not confine myself to any specific shape or form of either recess, groove, serration, or interstice in the washer for retaining the lubricant, but may use such as prudence and business practice may dictate without departing from my invention.

The washers hereinbefore described can be manufactured and sold at a figure not exceeding the prices now paid for the usual axle-washers, and with its superior advantages will render the same of great service and utility to the purchaser.

It is evident that the original blank cut from the hide may be punched out with a serrated circumference instead of circular, thereby reversing the order of using the dies. Such as well as other minor changes will readily suggest themselves to the intelligent artisan. It is further evident that I may provide both edges of the washer with serrations.

Having thus fully described my invention, I claim as new and desire to secure to myself by Letters Patent of the United States—

1. A leather axle-washer formed with lubricant-retaining spaces therein, substantially as described.

2. A leather axle-washer provided with lubricant-retaining spaces in its edges thereof, as and for the purpose set forth.

3. A leather axle-washer provided with serrations in its edges, forming lubricant-retaining-spaces, substantially as set forth.

4. A leather axle-washer provided with serrations in one of its edges to form lubricant-retaining spaces, as set forth.

5. A leather axle-washer having serrations in its edges and recesses in its body to form lubricant-retaining spaces, substantially as and for the purpose set forth.

6. A leather axle-washer having serrations in one of its edges and apertures in its body to form lubricant-retaining spaces, as set forth.

In testimony that I claim the foregoing as my invention I have hereto set my hand in the presence of two subscribing witnesses.

TIMOTHY GINGRAS.

Attest:
MICHAEL J. STARK,
WM. A. STARK.